(12) United States Patent
Qian et al.

(10) Patent No.: US 11,996,792 B2
(45) Date of Patent: May 28, 2024

(54) MOTOR-CURRENT CONTROL PROCESS FOR PERMANENT-MAGNET SYNCHRONOUS MOTORS AND RELATED SYSTEMS, METHODS AND DEVICES

(71) Applicant: Microchip Technology Incorporated, Chandler, AZ (US)

(72) Inventors: Jason Qian, Shanghai (CN); Betty Wang, Beijing (CN)

(73) Assignee: Microchip Technology Incorporated, Chandler, AZ (US)

( * ) Notice: Subject to any disclaimer, the term of this patent is extended or adjusted under 35 U.S.C. 154(b) by 18 days.

(21) Appl. No.: 16/948,906

(22) Filed: Oct. 5, 2020

(65) Prior Publication Data

US 2021/0159833 A1    May 27, 2021

(30) Foreign Application Priority Data

Nov. 21, 2019  (CN) .......................... 201911148300.3

(51) Int. Cl.
*H02P 25/024* (2016.01)
*H02P 21/14* (2016.01)
*H02P 21/22* (2016.01)

(52) U.S. Cl.
CPC .......... *H02P 25/024* (2016.02); *H02P 21/14* (2013.01); *H02P 21/22* (2016.02)

(58) Field of Classification Search
CPC ........ H02P 25/024; H02P 21/14; H02P 21/22; H02P 21/0003; H02P 6/28; H02P 21/0017
See application file for complete search history.

(56) References Cited

U.S. PATENT DOCUMENTS

| 5,406,474 A | * | 4/1995 | Hansen | ................ | G05B 13/045 |
| | | | | | 700/42 |
| 2009/0230900 A1 | | 9/2009 | Bae et al. | | |
| 2019/0140566 A1 | * | 5/2019 | Pramod | .................... | H02P 6/28 |

FOREIGN PATENT DOCUMENTS

| CN | 101557196 A | 10/2009 |
| CN | 105680755 A | 6/2016 |
| CN | 109004874 A | 12/2018 |
| JP | 2008-295125 A | 12/2008 |
| JP | 2009-195106 A | 8/2009 |

OTHER PUBLICATIONS

Chinese First Office Action for Chinese Application No. 201911148300. 3, dated Sep. 11, 2023, 15 pages with translation.

\* cited by examiner

*Primary Examiner* — Bickey Dhakal
(74) *Attorney, Agent, or Firm* — TraskBritt

(57) ABSTRACT

Described embodiments relate to motor control for synchronous motors, and more specifically, some embodiments relate to motor-current control for permanent-magnet synchronous motors. Embodiments of a current controller are described that include an adaptive controller configured to adapt to changing system dynamics of a PMSM. Embodiments of adaptive control techniques are described that involve estimating system parameters of a PMSM and adapting control actions to compensate for such estimated system parameters. Such adapted control actions may be expected to track an observed motor current to a desired motor current. Systems, methods and devices related to the above are also described.

26 Claims, 11 Drawing Sheets

STATE OF THE ART

MOTOR-CURRENT CONTROL PROCESS FOR PERMANENT-MAGNET SYNCHRONOUS MOTORS AND RELATED SYSTEMS, METHODS AND DEVICES

PRIORITY CLAIM

This application claims the benefit of the filing date of Chinese Patent Application Serial No. 201911148300.3, filed Nov. 21, 2019, the disclosure of which is hereby incorporated herein in its entirety by this reference.

TECHNICAL FIELD

Described embodiments relate, generally, to motor-current control and motor control more generally. Some embodiment relate, generally, to drivers that implements processes for tracking a motor current to a desired motor current and controllers for permanent-magnet synchronous motors that implement such processes.

BACKGROUND

Servo motors are specialized motors capable of accurate rotation angle control and speed control, and are often used for high-response, high-precision positioning of equipment. A variety of motors implementing different control techniques are used as servo motors. One type of motor used for servo motors are synchronous motors that synchronize rotation of a shaft to a frequency of a supply current. A typical synchronous motor includes multiphase alternating current (AC) electromagnets on a stator (i.e., non-rotating part) of the motor that creates a first magnetic field (also called a "stator field") which rotates in time with oscillations of a line current. A rotor (i.e., a rotating part) includes permanent magnets or electromagnets and turns in step with the first magnetic field at the same rate, and as a result, creates a second synchronized magnetic field (also called a "rotor field") of the AC motor. In theory, a rotation period of the rotor is exactly equal to an integral number of AC cycles.

Permanent-magnet synchronous motors (PMSMs) are synchronous motors that use permanent magnets embedded in the rotor to create the second, constant, magnetic field. A stator of a PMSM typically carries windings connected to an AC supply to produce a stator field (i.e., a rotating magnetic field) that rotates in time with oscillations of currents at the stator windings (such currents also called "stator currents" and "motor currents"). At synchronous speeds, a rotor of a PMSM poles' lock to the rotation of the stator field.

To achieve high performance motor control, vector control techniques called field-oriented control (FOC) are sometimes used for PMSMs. FOC algorithms decompose a stator current into two components: a magnetic field-generating part ($i_d$) and a torque-generating part ($i_q$). Each of $i_d$ and $i_q$ may be controlled separately. The reactance torque of a PMSM is the result of an interaction of the magnetic field of the stator and the rotor magnetic field. Stator currents are updated while a rotor spins to keep the stator flux (i.e., q-axis) at 90 degrees to the rotor flux (i.e., d-axis). A diagram of an example of a PMSM suitable for FOC is shown in FIG. 10. As shown in FIG. 10, windings a, b, and c are directionally located in a stator, and a rotor is arranged in a space defined by the stator. Axes corresponding to axis of the stator field generated by flowing current through each winding are shown as axis A, axis B, and axis C. Also shown are example quadrature (q) magnetic axis and direct (d) magnetic axis.

In the case of an FOC controlled motor, a rotation detector may be arranged to observe the rotation of the motor and feed motion information (e.g., rotation position and rotation velocity, without limitation) about the observed motion of the motor to a driver. Moreover, a current detector may be arranged to observe the motor currents (i.e., stator currents observed at respective stator windings) at the motor and feed motor current information about the observed currents of the motor to a driver. The driver may calculate errors, which errors may be indicative of a difference between a desired rotation/current of the motor and an observed motion/current of the motor. The driver may attempt to control the motor rotation by controlling the stator current to, in theory, reduce the error to zero. This enables the servo motor to perform highly accurate positioning operations, among other things.

BRIEF SUMMARY

While this disclosure concludes with claims particularly pointing out and distinctly claiming specific embodiments, various features and advantages of embodiments within the scope of this disclosure may be more readily ascertained from the following description when read in conjunction with the accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
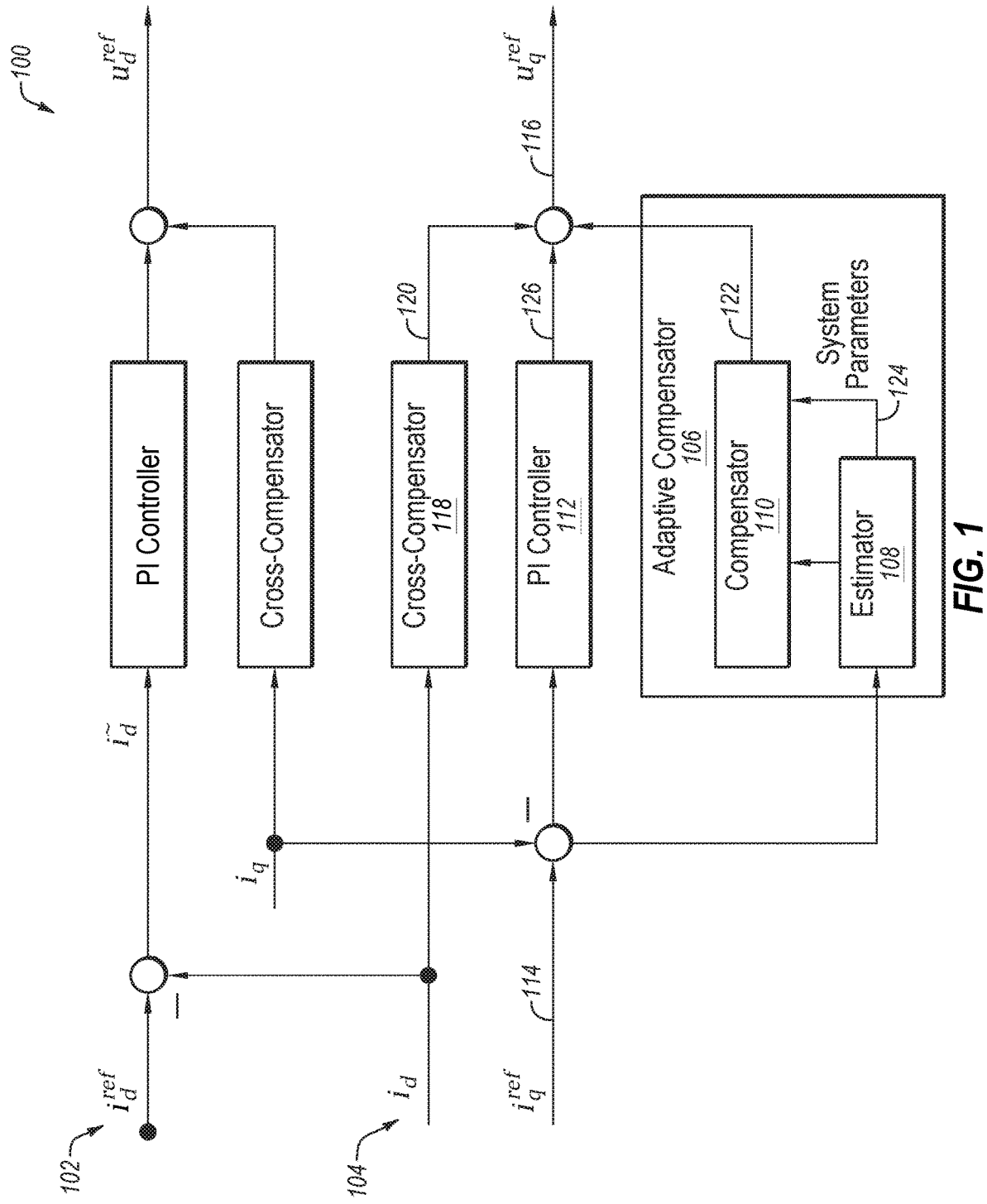
FIG. 1 illustrates field-oriented control (FOC) vector control technique used for control of permanent-magnet synchronous motors in accordance with one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer may be configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Proportional-Integral (PI) controllers are sometimes used for FOC. Generally stated, PI controllers receive an error signal as an input and generate a control action signal composed of a P-action and an I-action (also referred to herein as an I gain, $G_I$).

In the case of FOC, a PI controller implementing a PI control loop takes the current error $i^-$ as an input ($i^-$ being the difference between a desired current $i^{ref}$ and an observed current i), and outputs a control voltage reference $u^{ref}$—the control action—that is expected to achieve a desired stator current. As the stator current can be decomposed into d-axis and q-axis components, separate PI controllers may be used for the $i_q$ component and the $i_d$ component.

Looking at just the q-axis component, a PI controller attempts to minimize an error by finding a q-axis voltage $u_q^{ref}$ that achieves the desired q-axis current $i_q^{ref}$. A relationship between $u_q^{ref}$ and $i_q^{ref}$ is defined in Equation 1:

$$u_q^{ref} = L_q \cdot \frac{d}{dt} i_q^{ref} + R i_q^{ref} + \omega(L_d i_d + \psi_f) \quad \text{Equation 1}$$

Where $L_q$ represents the q-axis inductance, $L_d$ represents the d-axis inductance, R represents the phase resistance, $\psi_f$ represents the rotor flux, and $\omega$ represents the motor angular velocity. A control action taken by a PI controller may be defined by Equation 2:

$$u_q^{PI} = G_p \tilde{i}_q + G_I \int \tilde{i}_q \, dt \quad \text{Equation 2}$$

Where $G_P$ and $G_I$ are gains from performing P control actions and I control actions, respectively.

Small disturbances (e.g., vibrations, wear in equipment, without limitation) may result from operation of PMSMs, and servo motors more generally, and a degree of such disturbances may affect a control loop used for FOC. Compensators are sometimes used to ease the burden on a PI controller by tuning control system performance to account for system dynamics. In the case of FOC for a PMSM, compensation may be added to a q-axis control voltage $u_q^{ref}$ as defined by Equation 3:

$$u_q^{ref} = u_q^{comp} + u_q^{PI} \quad \text{Equation 3}$$

A compensation component of a control voltage $u_q^{comp}$ may be defined by Equation 4:

$$u_q^{comp} = L_q \frac{d}{dt} i_q^{ref} + R i_q^{ref} + \omega(L_d i_d + \psi_f) \quad \text{Equation 4}$$

Notably, compensation according to Equation 4 involves several system parameters in order to generate a compensation signal, including without limitation a q-axis inductance ($L_q$), a phase resistance (R), and a rotor flux ($\psi_f$).

Equation 4 is an ideal representation of the operation of a PMSM. The inventors of this disclosure now appreciate that in practice, it is not easy to precisely determine such system parameters. Moreover, Equation 4 does not necessarily improve current tracking performance of a controller, and may even weaken current tracking performance if an imprecise system parameter is used.

As a non-limiting example, a degree to which system parameter values accurately represent aspects of a current tracking process for a PMSM may decrease over time due to aforementioned disturbances. And as mentioned above, recalculating system parameters such as inductance, phase resistance, and rotor flux, is computationally intensive and such calculations are prone to imprecision that may render a process unstable.

Conventional techniques known to the inventors of this disclosure may rely on one or more of cross-item compensation between direct axis and quadrature axis, using a large PI action to increase control bandwidth, and/or high pulse-width modulation frequency and/or immediate updating of a PWM duty cycle to increase control bandwidth. Such techniques bring undesirable trade-offs, such as low-pass filter features of a current loop, weakened stability and higher noise, power loss and increased component cost and complexity, without limitation. So, improving current tracking, and motor-current control performance more generally, is often ignored in the case of FOC of PMSMs in favor of improving motion control performance.

The inventors of this disclosure appreciate that current tracking for FOC of PMSMs may be improved by estimating system parameters of the PMSM and imposing a complete compensation to reduce the burden (e.g., computational burden, without limitation) on a PI controller.

As used herein "rotate" means to perform at least a partial rotation about an axis. As non-limiting examples, a physical body (e.g., a shaft or a rotor, without limitation) may rotate about an axis, and a force may (e.g., a magnetic field, without limitation) may rotate about an axis.

FIG. 1 shows a FOC loop 100 that implements a current tracking process in accordance with one or more embodiments. FOC loop 100 includes a d-action block 102 and a q-action block 104. Only the q-action block 104 is discussed here because the ideal current for the direct component of d-action block 102 is generally understood to be zero.

Turning to q-action block 104, as shown in FIG. 1, q-action block 104 attempts to reduce an error function by determining error function reducing control actions. PI controller 112 outputs a first control action 126 in response to error 114, denoted in FIG. 1 as the difference between $i_q^{ref}$ and $i_q$. An adaptive compensation component 122, provided by adaptive compensator 106, and a cross-compensation component 120, provided by cross-compensator 118, are applied to first control action 126 to obtain second control action 116, denoted in FIG. 1 as $u_q^{ref}$.

Adaptive compensator 106 includes compensator 110 and estimator 108. As discussed herein, estimator 108 may be configured to provide precise information about motor parameters (e.g., q-axis inductance, a phase resistance, and a rotor flux, without limitation). By using precise information about motor parameters, the output of compensator 110 (i.e., compensation component of a control voltage $u_q^{comp}$) is more correct (e.g., relative to cases where less precise information about motor parameters are used by compensator 110) and so compensator 110 may relieve a burden on a PI controller, and at least some disadvantages of using a PI controllers with PMSM motors and servo motors more may be alleviated.

As a non-limiting example, in most cases, an original q-axis inductance and resistance of a motor will be very small, hence system parasitic inductance and resistance dramatically changes the actual q-axis inductance and resistance of motor as compared to the original q-axis inductance and resistance of the motor. In this situation, a compensator 110 alone is not able to provide a correct output, and so compensator 110 will not compensate anything, and may damage performance of a control system in which it is incorporated. As a further non-limiting example, q-axis inductance, resistance and rotor flux of a motor will vary with temperature. Even if compensator 110 alone provides a correct output when a motor starts running, while the motor continues to run the output of compensator 110 will become more and more incorrect (i.e., a difference between a correct output and an actual output will increase) as temperature increases.

Estimator 108 may be configured, generally, to implement adaptive control techniques to estimate system parameters 124. In particular, estimator 108 provides precise information about motor parameters to assist compensator 110— e.g., the output of compensator 110 is more correct as compared to the compensator 110 operating alone, without the assistance of estimator 108. Further, with the assistance of estimator 108, the performance of compensator 110 may relieve the burden on PI controller 112.

Adaptive control techniques are techniques for adapting an underlying control strategy for a process to, as a non-limiting example, adapt to dynamics of the process. Adapting an underlying control strategy is different than more general control of a process that involves adapting an output in response to a change in error between a desired parameter and an observed parameter. Adaptive control may be used in conjunction with and/or to improve such more general control.

As non-limiting examples, adaptive control techniques may include tuning input parameters to, or modifying expressions of, a control law—and in either case in response to changes in a behavior of a process. Notably, non-adaptive controllers, such as a PI controller or a PID controller, may become unstable if mismatches between a process and the controller's original tuning become too severe. Instability may be corrected by stopping a process and tuning/re-tuning a non-adaptive controller, and the non-adaptive control loop more generally, to the process. In contrast, a controller and/or control loop that implements adaptive control techniques may adapt an underlying control strategy while a process is being performed, in accordance with one or more embodiments.

Figure 2:
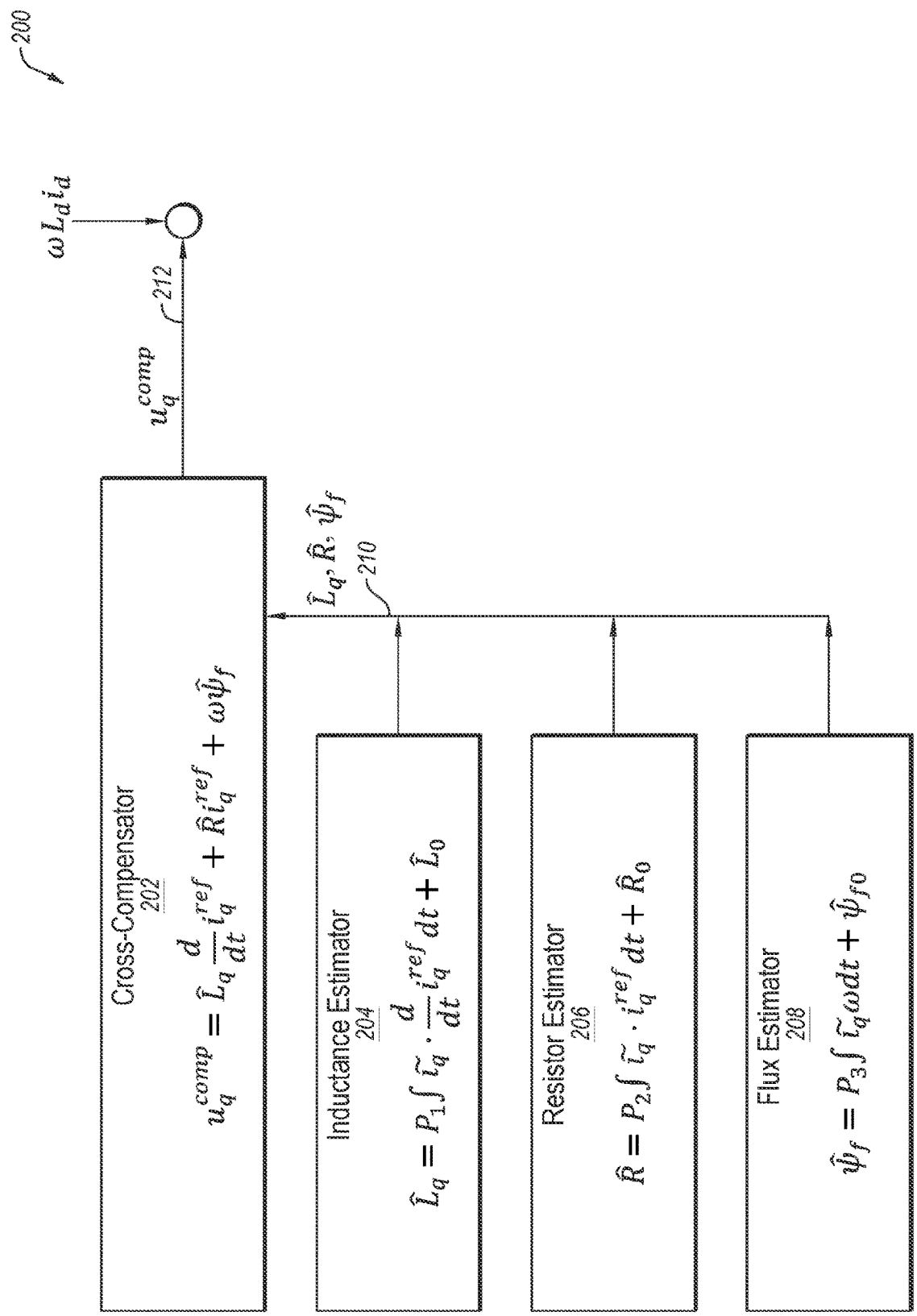
FIG. 2 illustrates a system for adaptive compensation in accordance with one or more embodiments.

FIG. 2 shows an embodiment of an adaptive compensator 200 (such as adaptive compensator 106, without limitation) for control of a current tracking process, in accordance with one or more embodiments. In the embodiment shown in FIG. 2, estimators assisting a compensator 202 includes a number of estimators (in FIG. 2, estimators 204, 206, and 208), each such estimator configured to calculate a system parameter.

Compensator 202 may be configured, generally, to calculate an adaptive compensation component 212, denoted $u_q^{comp}$, using Equation 4 (here, a control law), provided that estimated parameters are used in place of q-axis inductance ($L_q$), phase resistance (R), and rotor flux ($\psi_f$), namely, $\hat{L}_q$, $\hat{R}$, and $\hat{\psi}_f$. The estimated parameters are provided by one or more estimators as discussed below. The equation used by compensator 202 is denoted herein as Equation 4' (here, a modified control law) because estimated system parameters $\hat{L}_q$, $\hat{R}$, and $\hat{\psi}_f$ are used in place of $L_q$, R, and $\psi_f$:

$$u_q^{comp} = \hat{L}_q \frac{d}{dt} i_q^{ref} + \hat{R} i_q^{ref} + \omega \hat{\psi}_f \qquad \text{Equation 4'}$$

In Equation 4', The first sub-component is an inductance component defined by the expression:

$$\hat{L}_q \frac{d}{dt} i_q^{ref}.$$

Digital calculation of the expression $$\frac{d}{dt} i_q^{ref}$$

may introduce a lot of noise. Optionally, to address the noise, in some embodiments an estimator may be used (e.g., additionally or alternatively to one or more of estimators 204, 206 and 208) to calculate $$\frac{d}{dt} i_q^{ref}$$

using an approximation, such as defined in Equation 5:

$$\frac{d}{dt} i_q^{ref} = \left( J \frac{d}{dt} a^{ref} + \frac{d}{dt} T_l \right) \cdot \frac{1}{K_t} \qquad \text{Equation 5}$$

Where J is a rotor inertia, $a^{ref}$ is a desired acceleration, $K_t$ is a motor torque coefficient, and $T_l$ is a load torque. Equation 5 is an approximation of $$\frac{d}{dt} i_q^{ref}$$

that uses a kinetic law to calculate $$\frac{d}{dt} i_q^{ref},$$

and reduces noise introduced by digital computation.

The second component is a phase resistor component defined by the expression: $\hat{R} i_q^{ref}$.

The third component is a flux component defined by the expression: $\omega \hat{\psi}_f$.

At least three parameters 210 are used by compensator 202, $\hat{L}_q$, $\hat{R}$, and $\hat{\psi}_f$, where the respective caps denote that these are estimated system parameters. Three estimators assist compensator 202 with calculating the contribution of each of the three components to adaptive compensation component 212.

Inductance estimator 204 may be configured to estimate an inductance parameter, $\hat{L}_q$, used by compensator 202. Resistor estimator 206 may be configured to estimate a phase resistor parameter, $\hat{R}$, used by compensator 202. Flux estimator 208 may be configured to estimate a rotor flux parameter, $\hat{\psi}_f$, used by compensator 202.

In one embodiment, inductance estimator 204 may be configured to determine an estimated q-axis inductance parameter according to Equation 6:

$$\hat{L}_q = P_1 \int \tilde{i}_q \cdot \frac{d}{dt} i_q^{ref} dt + \hat{L}_0 \qquad \text{Equation 6}$$

In one embodiment, resistor estimator 206 may be configured to determine an estimated phase resistor parameter according to Equation 7:

$$\hat{R} = P_2 \int \tilde{i}_q \cdot i_q^{ref} dt + \hat{R}_0 \qquad \text{Equation 7}$$

In one embodiment, inductance flux estimator 208 may be configured to determine an estimated phase resistance parameter according to Equation 8:

$$\hat{\psi}_f = P_3 \int \tilde{i}_q \, \omega \, dt + \hat{\psi}_{f0} \qquad \text{Equation 8}$$

In Equations 6, 7 and 8, P1, P2, and P3 are estimated gains from control actions of a controller, and a control loop more generally, and the parameters $\hat{L}_0$, $\hat{R}_0$, and $\hat{\psi}_{f0}$ are initial estimating values for $\hat{L}_q$, $\hat{R}$, and $\hat{\psi}_f$, respectively. Any suitable technique known to those of ordinary skill in the art may be used to determine the gains from estimated control actions P1, P2, and P3.

As a non-limiting example, tuning techniques may be used to, generally stated, repeatedly guess at an estimated value and check until a satisfactory performance is achieved. As a further non-limiting example of an algorithm for determining estimated gains from control actions, P1, P2, and P3: initial arbitrary values for the estimated gains from control actions may be used, and a waveform corresponding to $\hat{L}_q$, $\hat{R}$, and $\hat{\psi}_f$ (i.e., waveforms corresponding to Equation 6, Equation 7 and Equation 8, respectively) may be generated and observed to determine how fast an estimated value becomes stable (i.e., an observed stabilization period). A stabilization period may be compared to a specified threshold. If an observed stabilization period is too long (i.e., an observed stabilization period is longer than a specified threshold) then an estimated gain from a control action may be increased. If an observed stabilization period is too short (i.e., an observed stabilization period is shorter than a specified threshold) then the estimated gain from a control action may be decreased. In another embodiment, a nominal value (i.e., a predetermined value) provided by a motor supplier may be used as an alternative to, or in addition to, an arbitrary value.

Figure 3:
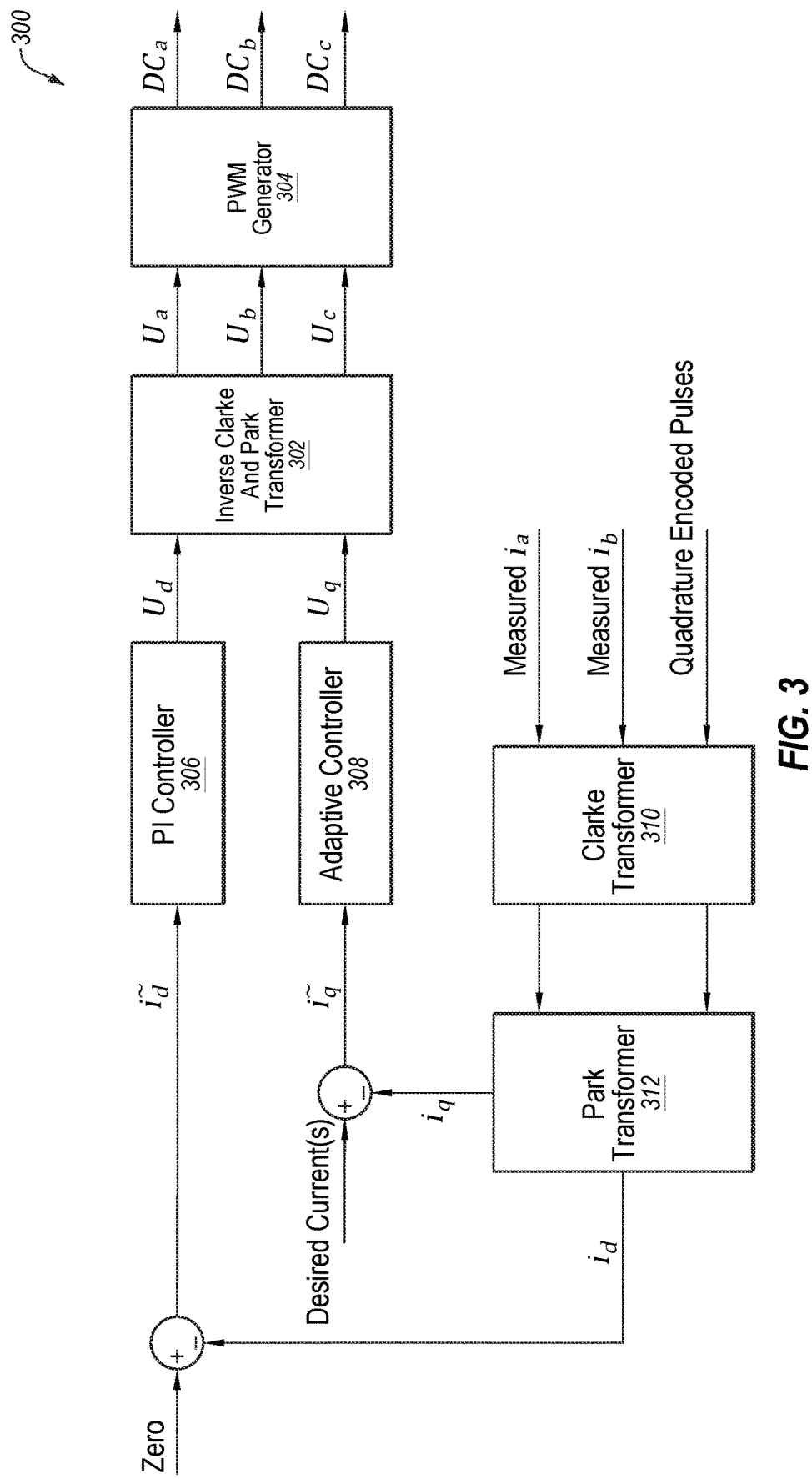
FIG. 3 illustrates a current control loop in accordance with one or more embodiments.

FIG. 3 shows a block diagram of a motor-current control loop 300, in accordance with one or more embodiments. As depicted, motor-current control loop 300 may include Clarke transformer 310, park transformer 312, PI controller 306, adaptive controller 308, inverse Clarke and Park transformer 302, and PWM generator 304.

Clarke transformer 310 may be configured to translate three-phase quantities ($i_a$, $i_b$, $i_c$) from a three-phase reference frame to a two-axis, orthogonal stationary reference, responsive to measured $i_a$, $i_b$, $i_c$ and quadrature encoded pulses. Only measured $i_a$ and measured $i_b$ are shown as inputs because $i_c$ may be determined from $i_s$ and $i_b$ using techniques known to those having ordinary skill in the art, although a measured $i_c$ may also be received and used. Since a rotor reference frame is constantly rotating, the quantities output by Clarke transformer 310, which are in a two-axis orthogonal reference frame, are translated by Park transformer 312 to the orthogonal reference frame consisting of the d-axis and q-axis. Various quantities in a (q, d) reference frame may be output by Park transformer 312, including, without limitation, $i_q$, $i_d$, $w_q$, and $w_d$—but only $i_q$ and $i_d$ are shown in FIG. 3 for the motor-current control loop 300.

PI controller 306 and adaptive controller 308 may be configured to output d and q control voltages, $u_d$ and $u_q$, respectively. In particular, adaptive controller 308 may be configured to generate a q-axis control voltage $u_q$ in accordance with FOC loop 100 and adaptive compensator 200 discussed herein, responsive to the q-axis motor current error $i_{\tilde{q}}$, which is the difference between desired q-axis current (e.g., $i_q^{ref}$) and an observed q-axis current $i_q$ calculated from measured currents $i_a$ and $i_b$ and calculated current $i_c$. PI controller 306 may be configured to output d-axis control voltage, $u_d$, responsive to the q-axis motor current error $i_{\tilde{q}}$, which is the difference between zero and an observed d-axis current $i_d$ calculated from measured currents $i_s$ and $i_b$ and calculated current $i_c$.

Inverse Clarke and Park Transformer 302 may be configured to convert the d-axis and q-axis referenced voltages $u_d$, $u_q$ output by PI controller 306 and adaptive controller 308, respectively, to a three-phase reference frame as $u_a$, $u_b$, and $u_c$.

PWM generator 304 may be configured to provide duty cycles of pulse-width modulated voltages (PWM voltages) $DC_a$, $DC_b$, and $DC_c$ in response to $u_a$, $u_b$, and $u_c$, respectively, and the PWM voltages, $DC_a$, $DC_b$, and $DC_c$, may be provided to a PMSM operatively coupled to an output of PWM generator 304.

Figure 4:
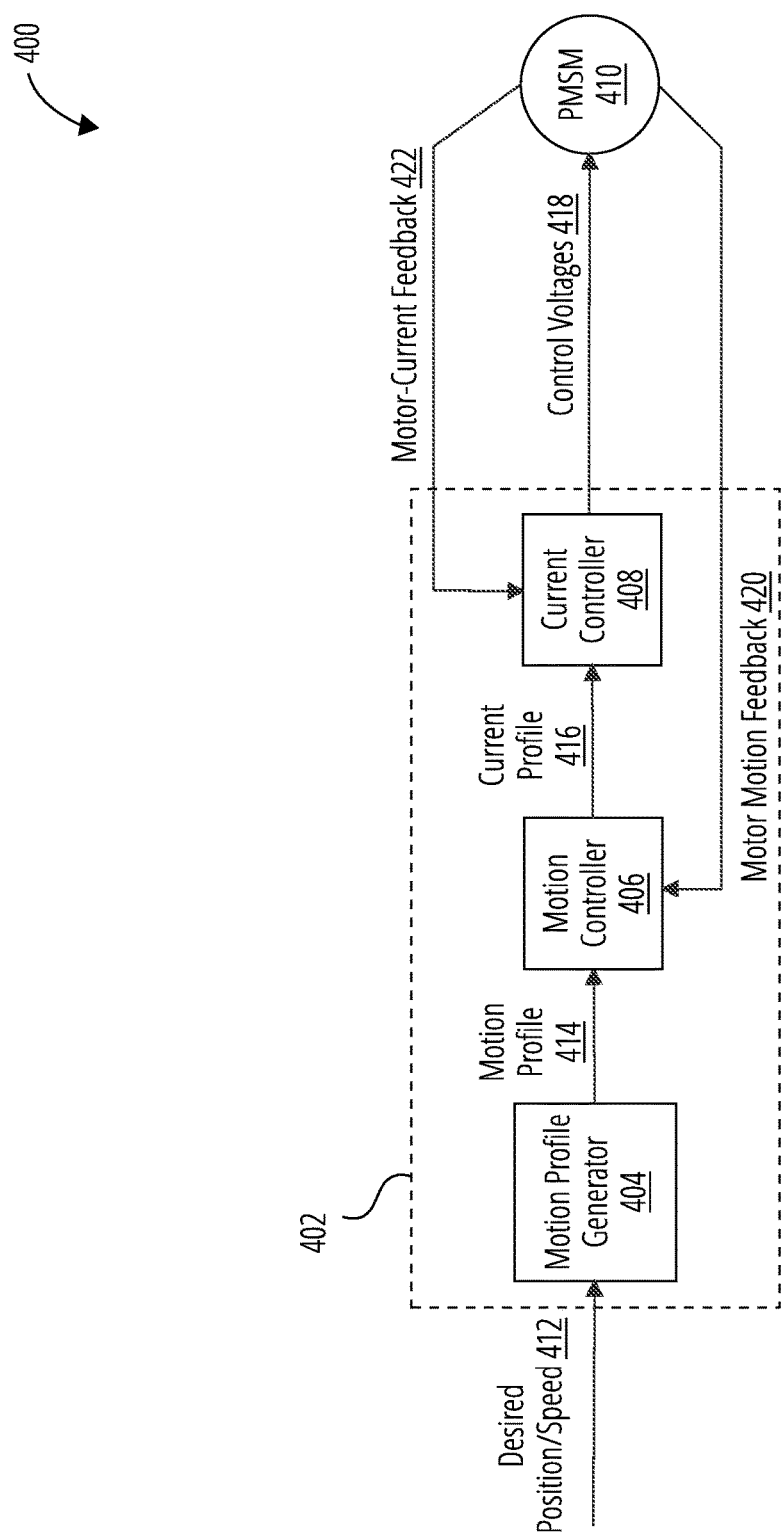
FIG. 4 illustrates a current driver in accordance with one or more embodiments.

FIG. 4 shows PMSM driving system 400, in accordance with one or more embodiments. PMSM driving system 400, among other control loops, implements a motor-current control loop for controlling motor currents of a motor configured a permanent-magnet synchronous motor (e.g., PMSM 410, without limitation), such as motor-current control loop 300 of FIG. 3, without limitation, in accordance with one or more embodiments.

PMSM driving system 400 may be configured to track a waveform of a motor current of PMSM 410 to a waveform defined by current profile 416. Consistent with the general usage of singular and plural terms in this description, while a singular form of the terms "voltage," "waveform," "current," and "profile" may be used with reference to FIGS. 4 to 9, such description is intended to encompass singular and plural, e.g., "voltage," "voltages," "waveform," "waveforms," "current," "currents," "profile," "profiles," and signals thereof. Such description is consistent with this disclosure, as a non-limiting example, FIG. 3, which shows multiple PWM voltages (e.g., $DC_a$, $DC_b$, and $DC_C$) for controlling multiple motor currents (e.g., $i_a$, $i_b$, $i_c$) of a PMSM, and a system for shaping the waveforms of such motor currents based on desired waveforms for motor currents.

As shown in FIG. 4, PMSM driving system 400 may include motion profile generator 404, motion controller 406 and current controller 408, which may be operatively coupled to comprise motor driver 402 for driving PMSM 410. In a contemplated use case, motor driver 402 may be implemented in a microcontroller, and that may be configured for primary responsibility for implementing motor driver 402 and PMSM driving system 400 more generally. In another contemplated use case, motor driver 402 may be implemented in a microcontroller that includes motor driver 402 and other control elements (such as process controller 602 of FIG. 6, without limitation).

Motion profile generator 404 may be configured, generally, to create one or more s-curve motion profiles that define desired motion states of a PMSM over time responsive to desired position/speed 412. As a non-limiting example, a motion profile generated by motion profile generator 404 will define a position and a speed of a PMSM at a given point in time over a period of time. In the case of an s-curve, waveforms of a motion profile created by motion profile generator 404 will be smooth (i.e., differentiable) and a period of the waveform is substantially in the shape of an "s." As non-limiting examples, motion profile generator 404 may be configured to create motion profiles using symmetric references, asymmetric references, and combinations thereof. Motion profiles correspond to desired position/speed. A motion profile 414 corresponding to desired position/speed 412 is chosen by motion profile generator 404 and provided to motion controller 406.

Motion controller 406 may be configured, generally, to perform a control loop that involves providing a current profile 416 expected to result in motion of PMSM 410 (e.g., rotation, without limitation) substantially in accordance with motion profile 414. As part of such a control loop, motion controller 406 receives motor motion feedback 420 indicative of motion of PMSM 410 (e.g., speed, position, torque, rotational angle, without limitation) and attempts to reduce motion error by adjusting (e.g., adding, changing, deleting) one or more features of current profile 416 thereby obtaining an updated current profile 416. In one or more embodiments, motion controller 406 may include one or more component motion controllers, including without limitation, a position controller, a velocity controller, and/or a torque controller, and each such component controller may also implement one or more control loops.

Current profile 416 may include, among other information, a desired waveform of motor current feedback 422. Current controller 408 may be configured, generally, to perform a motor-current control loop (e.g., motor-current control loop 300 of FIG. 3, without imitation) that involves providing control voltages 418 that are expected to result in motor currents at PMSM 410 that track current profile 416.

As discussed herein, it is desirable for a waveform of a motor current to match a desired waveform of current profile 416. So, as part of a motor-current control loop, current controller 408 receives motor current feedback 422 indicative of one or more motor current at PMSM 410. Current controller 408 may attempt to reduce current error (which may also be characterized herein as "tracking error") by adjusting control voltages 418 as described herein, i.e., by adjusting features exhibited by a waveform of $DC_a$, $DC_b$, and/or $DC_c$ generated by PWM generator 304 of FIG. 3. In this manner, current controller 408 may be configured to control tracking of motor currents of PMSM 410 to current profile 416 provided by motion controller 406.

While not shown in FIG. 4, PMSM driving system 400 may include an inverter circuit configured for converting the DC voltages output by a PWM generator of current controller 408 (e.g., PWM generator 304 of FIG. 3) into corresponding AC voltages exhibiting a desired pulse width and pulse frequency, without limitation.

Notably, while performing a cycle of a motor-current control loop, current controller 408 may use a current profile 416 of a previous cycle or use a current profile 416 updated by motion controller 406 since a previous cycle. So, tracking error may result from a failure to fully tune control voltages such that motor currents track current profile 416, may result from an adjustment to current profile 416 by motion controller 406, and combination thereof, without limitation.

Figure 5A:
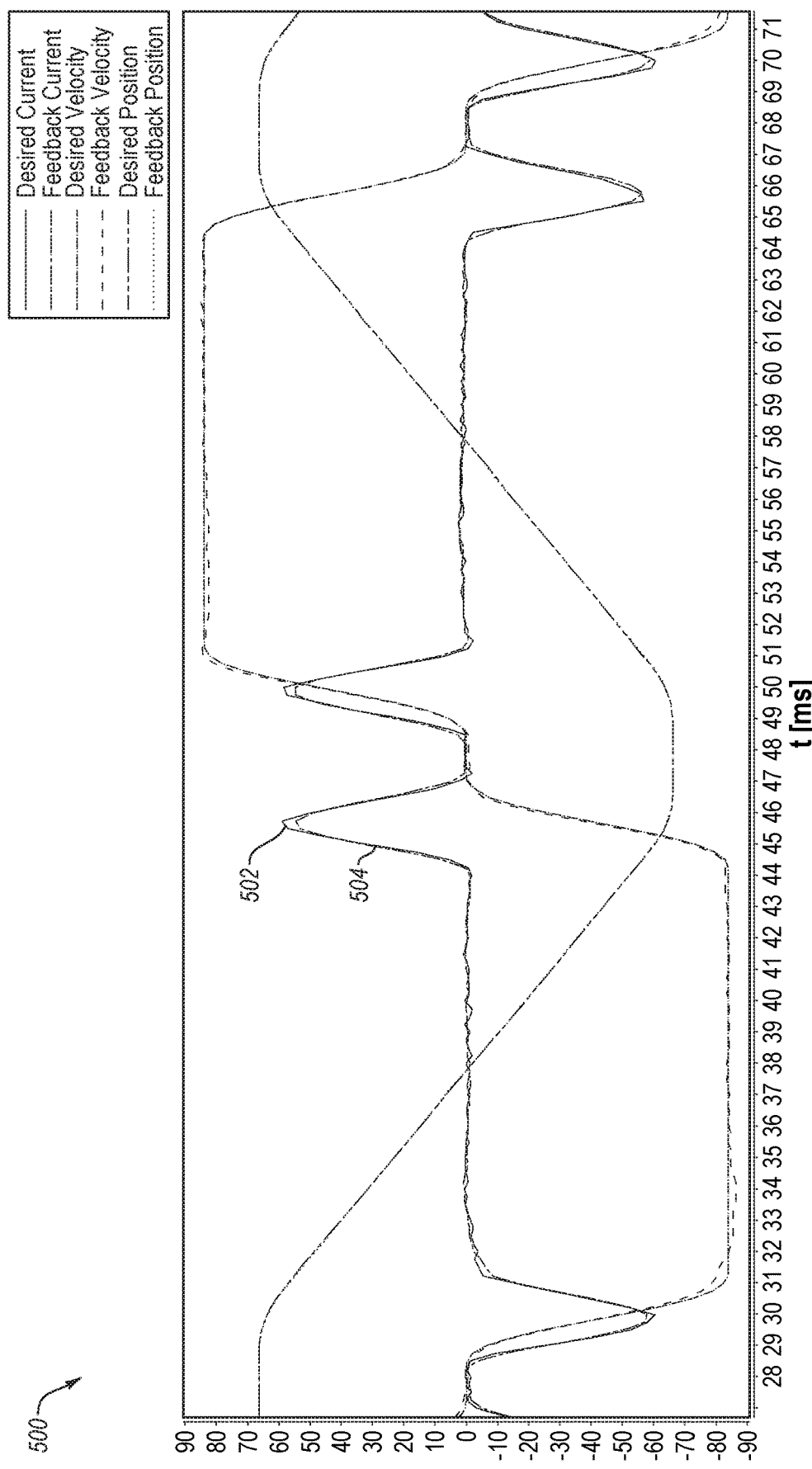
FIGS. 5A and 5B illustrate waveforms associated with motor control and, more specifically, current tracking, in accordance with one or more embodiments.
Figure 5B:
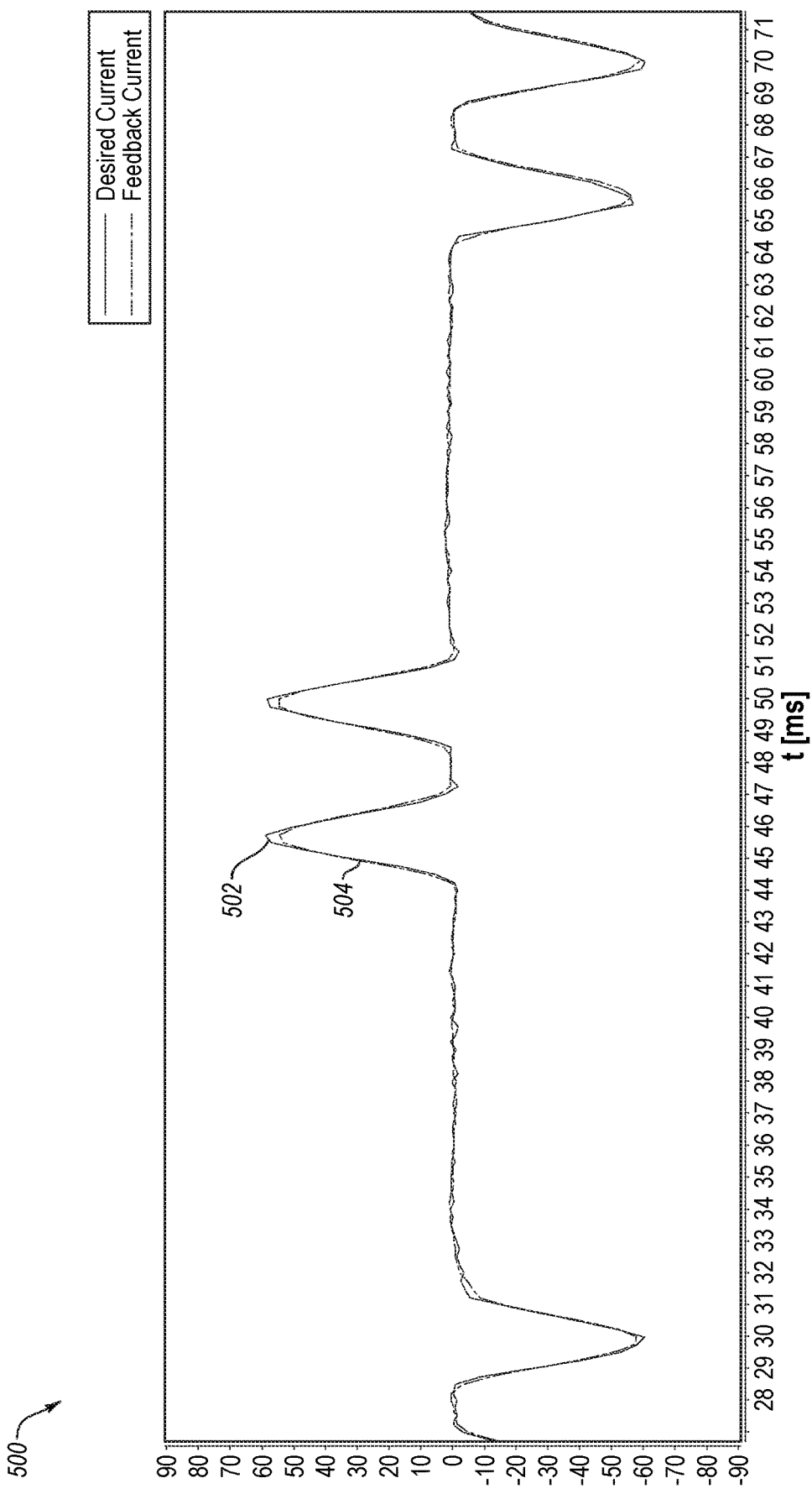

FIGS. 5A and 5B are signal diagrams illustrating waveforms associated with motor control and more specifically, current-tracking. FIGS. 5A and 5B depict examples of waveforms for a desired current, feedback current, desired velocity, feedback velocity, desired position, and feedback position generated while performing a motor control process, and more specifically, while performing a current tracking process 500 in accordance with one or more embodiments. As non-limiting examples, such a motor control process/current tracking process may be performed by PMSM driving system 400 or, more specifically, a motor-current control loop 300 for generating one or more of the control voltages $DC_a$, $DC_b$, or $DC_c$. FIG. 5B depicts the desired current and feedback current depicted in FIG. 5A, but without being obscured by depictions of other waveforms.

As depicted in FIG. 5B, current tracking process 500 is tracking desired current profile 504 (e.g., $i_q^{ref}$) with measured motor current 502 (e.g., $i_q$, provided with motor current feedback 422). Notably, the waveform 502 of measured motor current tracks a waveform 504 of a desired current profile.

Figure 6:
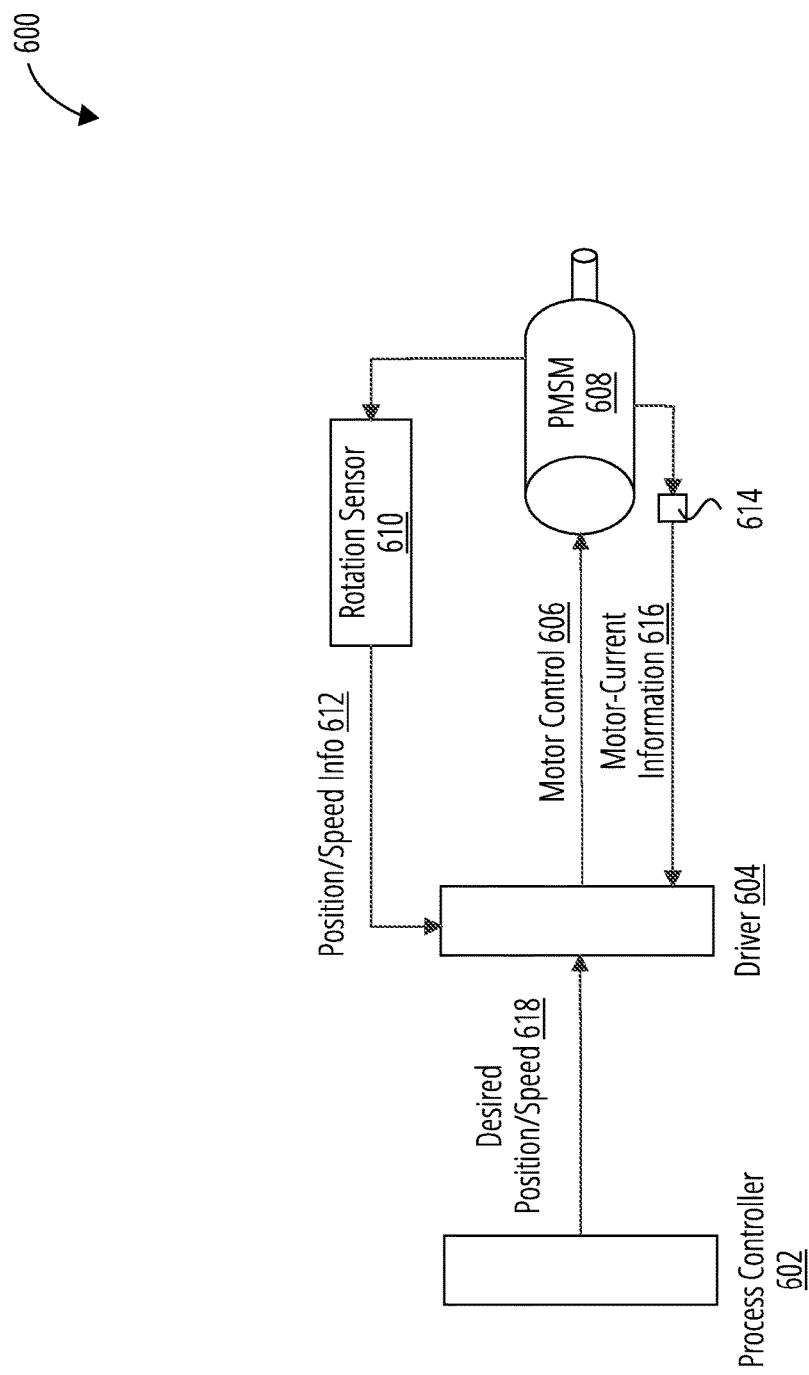
FIG. 6 illustrates a motor control system that implements adaptive compensation in accordance with one or more embodiments.

FIG. 6 shows a controlled motor system 600 for velocity vector controlled PWM for FOC PMSMs, in accordance with one or more embodiments.

As shown in FIG. 6, process controller 602 may be configured to provide desired position/speed 618 in accordance with a desired position and/or speed of PMSM 608 and/or equipment that is mechanically controlled by PMSM 608.

Driver 604 (e.g., a motor driver 402 of FIG. 4, without limitation), in response to desired position/speed 618, may be configured to provide motor control 606 to PMSM 608. Motor control 606 may include, without limitation, PWM voltages (including without limitation a series of PWM voltages provided as part of a number of cycles of a control loop) expected to result in rotation of PMSM 608 to the position and at the speed specified in desired position/speed 618.

Rotation sensor 610 captures motion information about PMSM 608 (e.g., position/speed info 612, without limitation) and sends it to driver 604 for adjusting motor control 606 to comply with desired position/speed 618.

Moreover, current sensor 614 captures motor current information 616 about motor currents at PMSM 608 and feeds the motor current information 616 to driver 604. Driver 604 compares the motor current information 616 to a desired signal for current sensor 614 and adjusts motor control 606 in response to such comparisons, as described herein.

Figure 7:
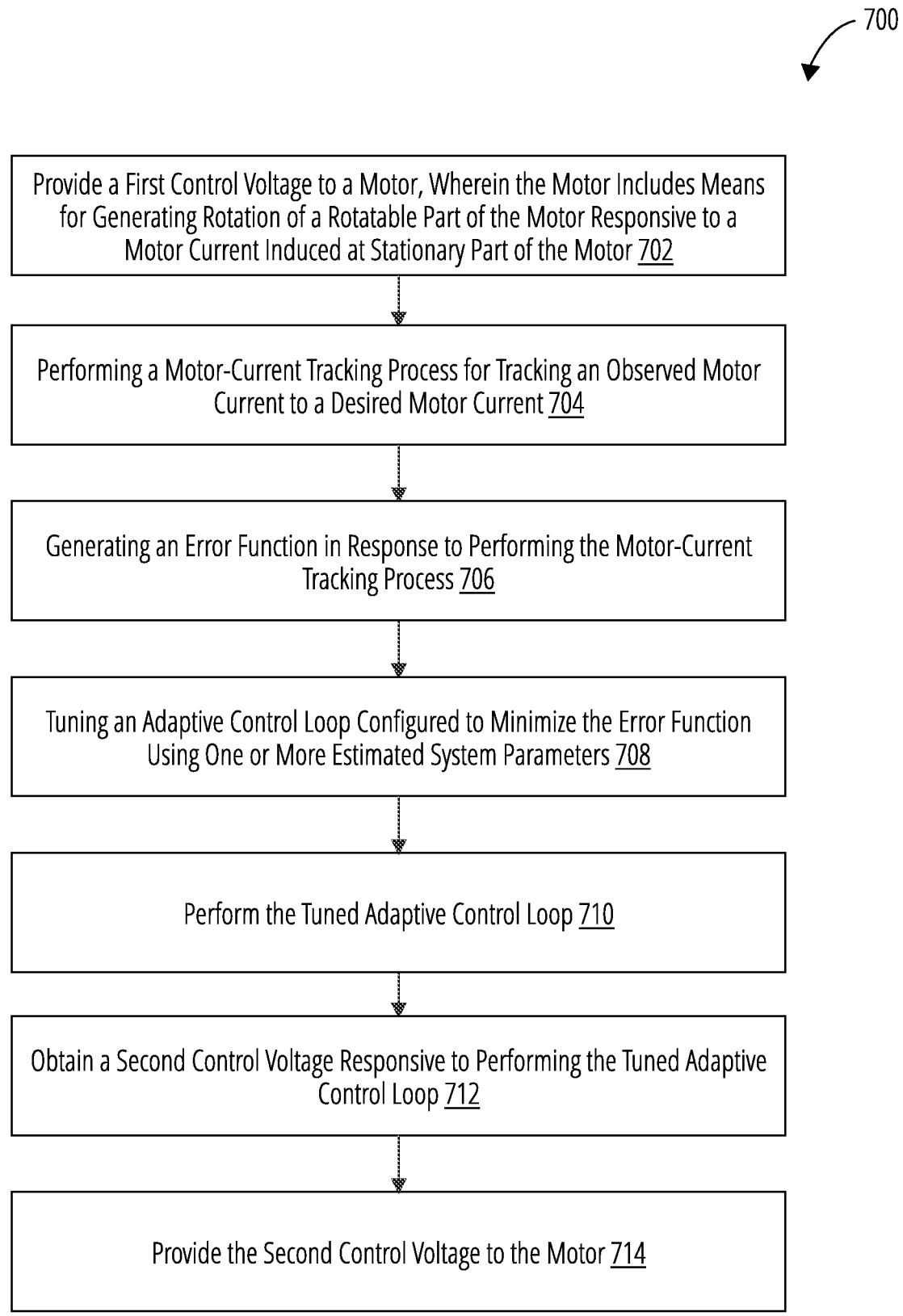
FIG. 7 illustrates a motor control process in accordance with one or more embodiments.

FIG. 7 shows a flow chart of a process 700 for controlling a PMSM, in accordance with one or more embodiments.

In operation 702, process 700 provides a control voltage to a motor responsive to a desired motor current. The motor may include means for generating rotation of a rotatable part of the motor responsive to a motor current induced at stationary part of the motor. The means for generating a rotation of the rotatable part of the motor responsive to the motor current induced at the stationary part of the motor may include without limitation a PMSM, including without limitation an FOC PMSM.

In operation 704, process 700 performs a motor current tracking process for tracking an observed motor current to a desired motor current. Performing the motor current tracking process may, initially, involve determining a control voltage that is expected to generate an observed motor current that tracks a desired motor current.

In operation 706, process 700 generates an error function in response to performing the motor current tracking process in operation 704. The error function is indicative of a difference between an observed motor current and a desired motor current.

In operation 708, process 700 tunes an adaptive control loop using one or more estimated system parameters. The adaptive control loop may be configured to minimize the error function. Tuning the adaptive control loop may include tuning functions for generating the estimated system parameters until stable estimated system parameters are obtained. Tuning estimated system parameters may include tuning functions for one or more of $\hat{L}_q$, $\hat{R}$, and $\hat{\psi}_f$ as well as other system parameters, as discussed herein. Process 700 may perform tuning of the adaptive control loop without interrupting the motor current tracking process of operation 706.

In operation 710, process 700 performs the adaptive control loop for minimizing the error function tuned in operation 708. Minimizing the error function may involve attempting to reduce a difference between the desired motor current and the observed motor current as indicated by the error function. Attempting to minimize the error function may include attempting to determine control actions that are expected to minimize the error function, that is, reduce a difference between an observed waveform of an observed motor current and a waveform of the desired motor current.

In operation 712, process 700 obtains a second control voltage responsive to performing the tuned adaptive control loop in operation 710. The second control voltage may be configured to minimize the error function, and more specifically, to minimize a difference between the observed motor current and the desired motor current.

In operation 714, process 700 provides the second control voltage determined in operation 712 to the motor.

Figure 8:
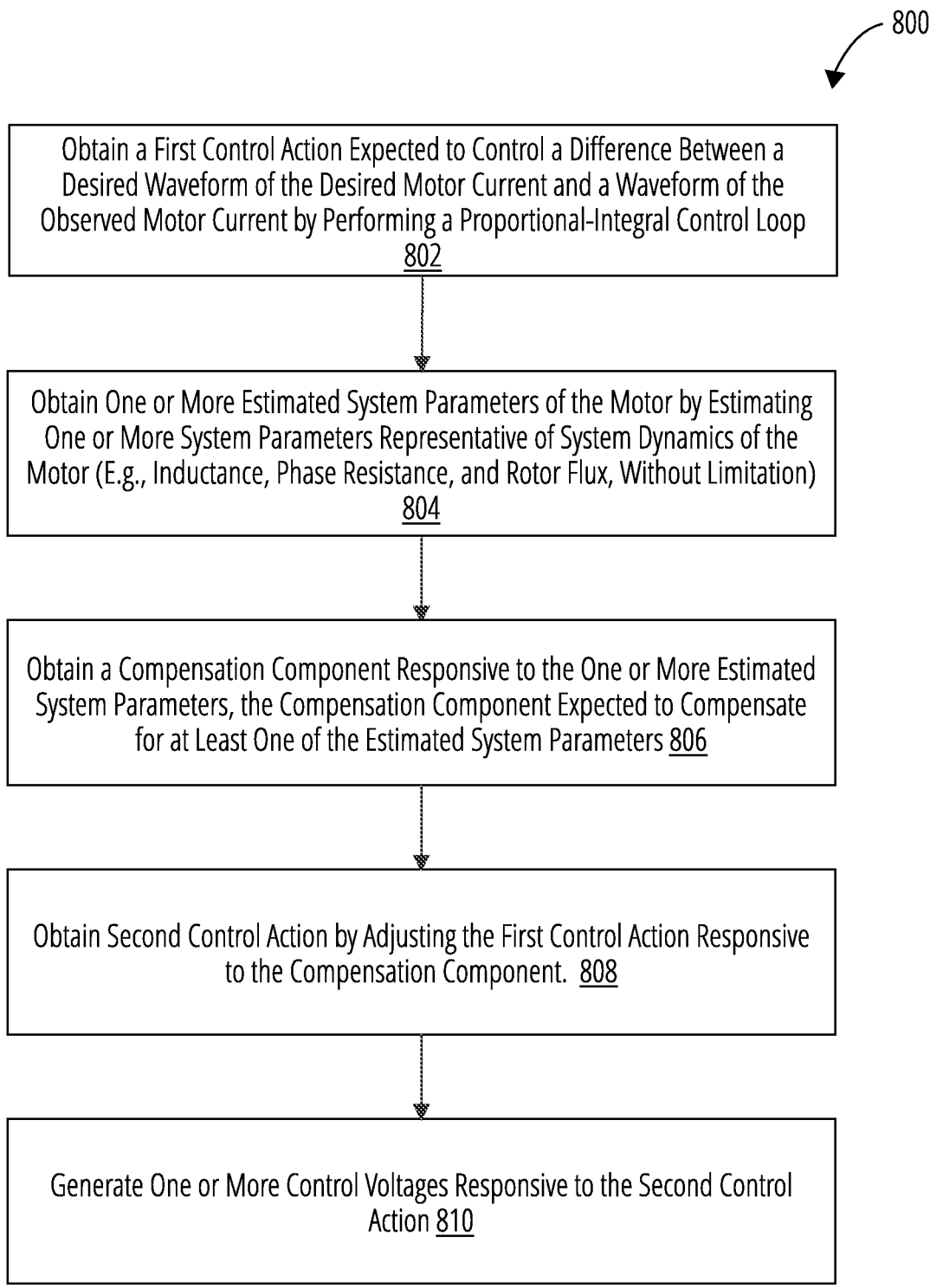
FIG. 8 illustrates a process for performing an adaptive control loop to minimize an error function.

FIG. 8 shows a flow chart of a process 800 for performing an adaptive control loop to minimize an error function.

In operation 802, process 800 obtains a first control action expected to control a difference between a desired waveform of the desired motor current and a waveform of the observed motor current. In one embodiment, process 800 may obtain the first control action by performing a proportional-integral control loop.

In operation 804, process 800 obtains one or more estimated system parameters of the motor. In one embodiment, process 800 obtains the one or more estimated system parameters by estimating one or more system parameters representative of system dynamics of the motor. As non-limiting examples, estimated system parameters may include estimated inductance, estimated phase resistance, and estimated rotor flux.

In operation 806, process 800 obtains a compensation component responsive to the one or more estimated system parameters. In one embodiment, the compensation component is expected to compensate for at least one of the estimated system parameters obtained in operation 804.

In operation 808, process 800 obtains a second control action responsive to the compensation component obtained in operation 806. In one embodiment, the second control action is obtained by adjusting the first control action to compensate for at least one of the estimated system parameters.

In operation 810, process 800 generates one or more control voltages responsive to the second control action obtained in operation 808. The one or more control voltages may be generated by a PWM generator (e.g., PWM generator 304). Prior to generating the one or more control voltages, the second control action may be converted to a multi-phase frame of reference.

The one or more control voltages may be chosen to minimize a difference between waveforms exhibited by measured motor currents (e.g., in terms of a pulse width and pulse frequency exhibited by such waveforms, without limitation) and a desired waveform of a desired current profile for the motor currents of a PMSM.

Figure 9:
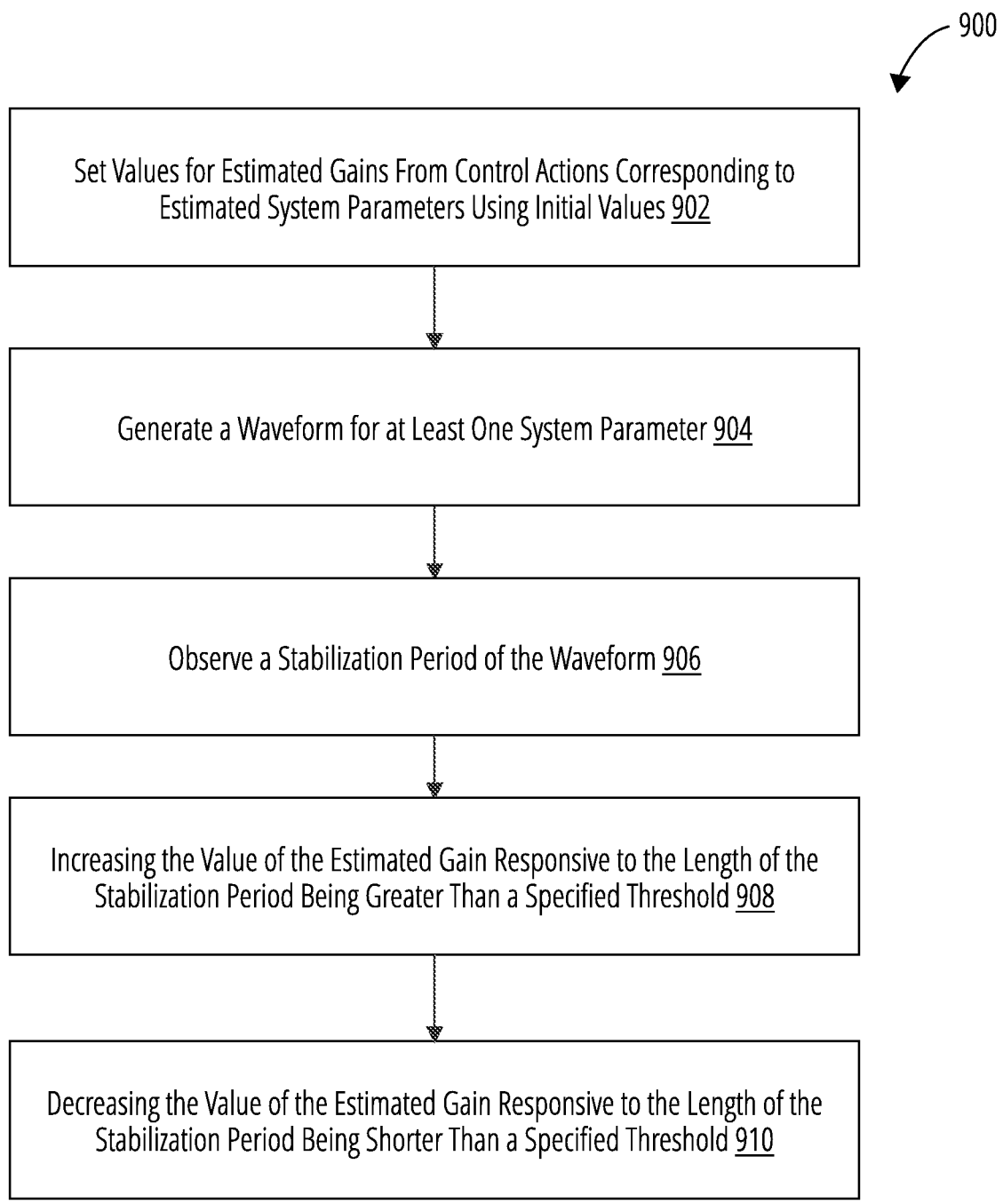
FIG. 9 illustrates a process for determining estimated gains as part of performing an adaptive control loop, in accordance with one or more embodiments.

FIG. 9 illustrates a process 900 for determining estimated gains as part of performing an adaptive control loop, in accordance with one or more embodiments.

In operation 902, process 900 sets values for estimated gains from control actions (e.g., P1, P2, P3 of Equations 9, 10 and 11) corresponding to estimated system parameters (e.g., L, R and $\Psi$ estimated) using initial values. In one embodiment, initial values may be arbitrary values. In another embodiment, initial values may be provided by a motor manufacturer. In operation 904, process 900 generates a waveform for at least one of the system parameters. The waveform generated in operation 904 may be the function defined by one of Equations 9, 10 or 11. In operation 906, a stabilization period is observed for the waveform generated in operation 904. The stabilization period is the period of time it takes for the waveform to stabilize. If a length of the stabilization period observed in operation 906 is greater than a specified threshold (i.e., the waveform stabilized too slowly), then in operation 908 the value of the estimated gain is increased. If a length of the stabilization period observed in operation 906 is less than a specified threshold (i.e., the waveform stabilized too fast), then in operation 910 the value of the estimated gain is decreased.

Figure 10:
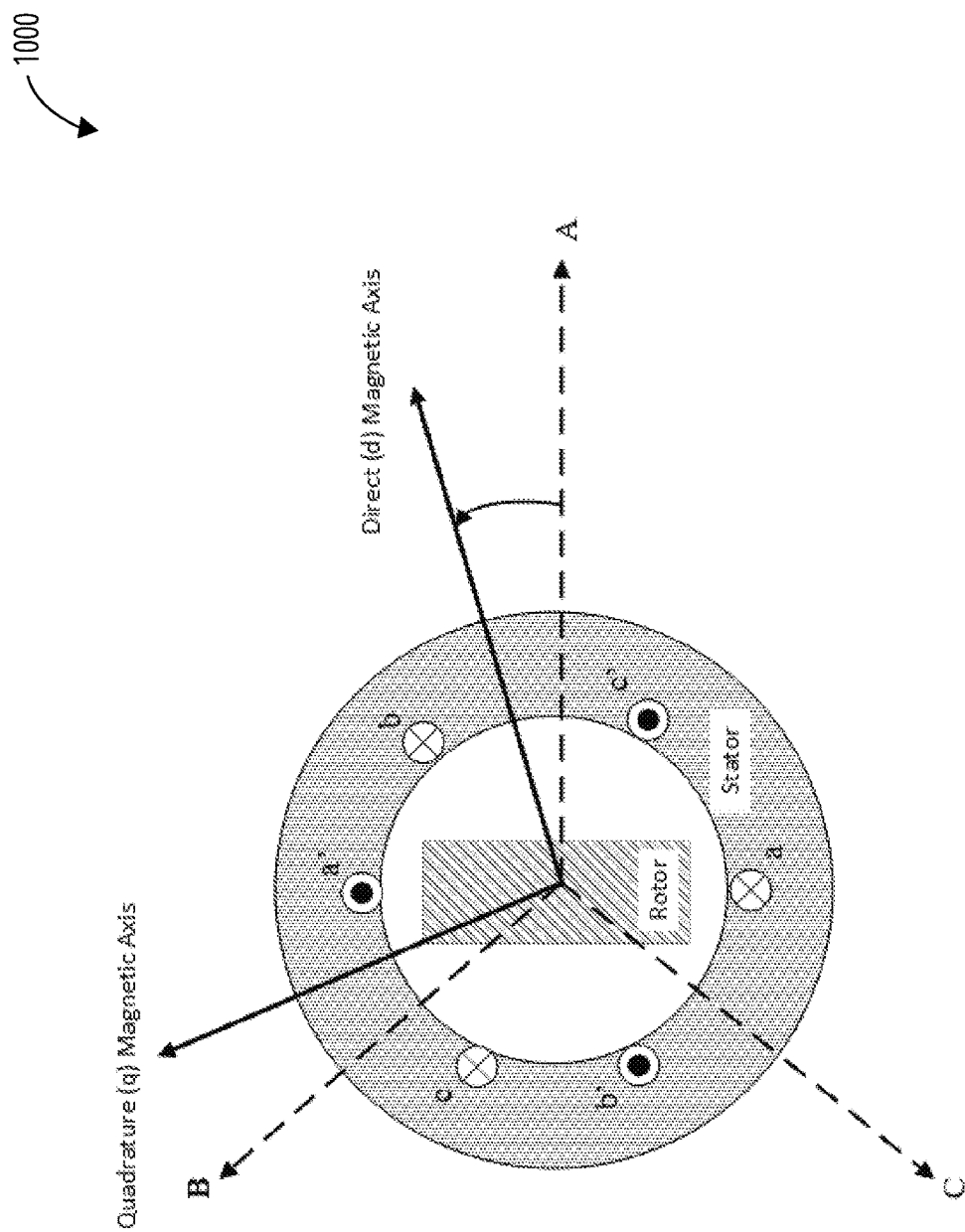
FIG. 10 illustrates a PMSM in accordance with the state of the art as known to the inventors of this disclosure.

FIG. 10 illustrates an example for control of an FOC PMSM 1000, namely, the q and d components as well as exemplary axis of three-phase system, as discussed herein. Shown are stator windings a, b, and c. In operation, each stator winding a, b, and c receives a current (i.e., a stator current). The waveform for each stator winding is different.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation," or "one or more of A, B, and C, without limitation," is used, in general, such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: A method of controlling a motor configured for generating rotation of a rotatable part of the motor responsive to a motor current induced at a stationary part of the motor, the method comprising: providing a control voltage to a motor; performing a motor current tracking process for tracking an observed motor current to a desired motor current; generating an error function responsive to the performing the motor current tracking process; tuning an adaptive control loop configured to minimize the error function using one or more estimated system parameters; and performing a control action responsive to the tuned adaptive control loop.

Embodiment 2: The method according to Embodiment 1, further comprising: obtaining a first control action expected to control a difference between a desired waveform of the desired motor current and an observed waveform of the observed motor current; obtaining one or more estimated system parameters of the motor; obtaining a compensation component responsive to the one or more estimated system parameters; and obtaining a second control action by adjusting the first control action responsive to the compensation component.

Embodiment 3: The method according to any of Embodiments 1 and 2, wherein the obtaining the one or more estimated system parameters of the motor comprises estimating one or more system parameters representative of system dynamics of the motor.

Embodiment 4: The method according to any of Embodiments 1 through 3, wherein the estimating the system parameter representative of system dynamics of the motor comprises estimating one or more of inductance, phase resistance, and rotor flux.

Embodiment 5: The method according to any of Embodiments 1 through 4, wherein the obtaining the compensation component responsive to the one or more estimated system parameters comprises determining a component expected to compensate for at least one of the estimated system parameters.

Embodiment 6: The method according to any of Embodiments 1 through 5, further comprising providing a second control voltage to the motor responsive to a control action obtained by performing the adaptive control loop.

Embodiment 7: The method according to any of Embodiments 1 through 6, wherein performing the adaptive control loop comprises: setting values for estimated gains from control actions corresponding to estimated system parameters using initial values; generating a waveform for at least one system parameter; and tuning a value of an estimated gain that corresponds to the at least one system parameter responsive to the waveform.

Embodiment 8: The method according to any of Embodiments 1 through 7, further comprising: observing a stabilization period of the waveform; and changing the value of the estimated gain responsive to a length of the stabilization period.

Embodiment 9: The method according to any of Embodiments 1 through 8, wherein changing the value of the estimated gain responsive to the length of the stabilization period comprises: increasing the value of the estimated gain responsive to the length of the stabilization period being greater than a specified threshold.

Embodiment 10: The method according to any of Embodiments 1 through 9, wherein changing the value of the estimated gain responsive to the length of the stabilization period comprises: decreasing the value of the estimated gain responsive to the length of the stabilization period being shorter than a specified threshold.

Embodiment 11: A motor controller for driving a motor configured as a permanent-magnet synchronous motor, PMSM, the motor controller comprising a processor and a non-transitory machine-readable medium, the medium including instructions that, when executed by the processor, configure the motor controller to: provide a first control voltage for the motor; perform a motor current tracking process for tracking an observed motor current to a desired motor current; generate an error function responsive to the performing the motor current tracking process; tune an adaptive control loop configured to minimize the error function responsive to one or more estimated system parameters; and provide a second control voltage responsive to the tuned adaptive control loop.

Embodiment 12: The motor controller according to Embodiment 11, wherein the instructions, when executed by the processor, further configure the motor controller to: obtain a first control action expected to control a difference between a desired waveform of the desired motor current and an observed waveform of the observed motor current; obtain one or more estimated system parameters of the motor; obtain a compensation component responsive to the one or more estimated system parameters; and obtain a second control action by adjusting the first control action to responsive to the compensation component.

Embodiment 13: The motor controller according to any of Embodiments 11 and 12, wherein the instructions, when executed by the processor, further configure the motor controller to obtain the one or more estimated system parameters of the motor by estimating one or more system parameters that are representative of system dynamics of the motor.

Embodiment 14: The motor controller according to any of Embodiments 11 through 13, wherein the instructions, when executed by the processor, further configure the motor controller to estimate a system parameter representative of system dynamics of the motor by estimating one or more of inductance, phase resistance, and rotor flux.

Embodiment 15: The motor controller according to any of Embodiments 11 through 14, wherein the instructions, when executed by the processor, further configure the motor controller to obtain the compensation component responsive to the one or more estimated system parameters by determining a component expected to compensate for at least one of the estimated system parameters.

Embodiment 16: The motor controller according to any of Embodiments 11 through 15, wherein the instructions, when executed by the processor, further configure the motor controller to provide a second control voltage to the motor responsive to a control action obtained by performing the adaptive control loop.

Embodiment 17: The motor controller according to any of Embodiments 11 through 16, wherein the instructions, when executed by the processor, further configure the motor controller to perform the adaptive control loop by: setting values for estimated gains from control actions corresponding to estimated system parameters using initial values; generating a waveform for at least one system parameter; and tuning a value of an estimated gain that corresponds to the at least one system parameter responsive to the waveform.

Embodiment 18: The motor controller according to any of Embodiments 11 through 17, wherein the instructions, when executed by the processor, further configure the motor controller to perform the adaptive control loop by: observing a stabilization period of the waveform; and changing the value of the estimated gain responsive to a length of the stabilization period.

Embodiment 19: The motor controller according to any of Embodiments 11 through 18, wherein the instructions, when executed by the processor, further configure the motor controller to change the value of the estimated gain responsive to the length of the stabilization period by: increasing the value of the estimated gain responsive to the length of the stabilization period being greater than a specified threshold.

Embodiment 20: The motor controller according to any of Embodiments 11 through 19, wherein the instructions, when executed by the processor, further configure the motor controller to change the value of the estimated gain responsive to the length of the stabilization period by: decreasing the value of the estimated gain responsive to the length of the stabilization period being shorter than a specified threshold.

Embodiment 21: A system, comprising: a motor configured as a field-oriented controlled permanent-magnet synchronous motor; and a driver, the driver configured to perform a current tracking process for tracking an observed motor current of the motor to a desired motor current for the motor, the process comprising: generating an error function responsive to the current tracking process; tuning an adaptive control loop configured to minimize the error function responsive to a compensation function that uses estimated system parameters; and providing, responsive to the tuned adaptive control loop, a control voltage for the motor.

Embodiment 22: The system according to Embodiment 21, wherein the error function is indicative of a difference between a desired motor current and an observed motor current.

Embodiment 23: The system according to any of Embodiments 21 and 22, wherein the driver comprises: a motion profile generator to generate a desired motion profile responsive to one or more of a desired position and a desired speed; a motion controller configured to output a desired current profile responsive to the desired motion profile; and a current controller configured to output a control voltage responsive to the desired current profile.

Embodiment 24: The system according to any of Embodiments 21 through 23, wherein the current controller comprises: a controller configured to implement a d-axis control loop; and an adaptive controller configured to implement a q-axis control loop.

Embodiment 25: The system according to any of Embodiments 21 through 24, wherein the current controller further comprises a Park transformer operably coupled to an output of a Clarke transformer, the operably coupled Park transformer and Clark transformer configured to receive an observed motor current and an observed motion of the motor and convert the observed motor current and the observed motion to a q-axis and d-axis component.

Embodiment 26: The system according to any of Embodiments 21 through 25, wherein the current controller further comprises a pulse-width modulation generator configured to generate pulse-width modulated voltage control signals.

Embodiment 27: The system according to any of Embodiments 21 through 26, wherein the motion controller comprises: a speed controller configured to determine a speed component of the desired motion profile; and a position controller configured to determine a position component of the desired motion profile.

Embodiment 28: The system according to any of Embodiments 21 through 27, further comprising: a first feedback path for providing motion information about an operation of the motor to the motion controller; and a second feedback path for providing motor current information about the motor current supplied to the motor to the current controller.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method, comprising:
providing a control voltage to a motor, a rotatable part of the motor to rotate responsive to a motor current induced at a stationary part of the motor;
performing a motor current tracking process for tracking an observed motor current to a desired motor current;
generating an error function representing a difference between the observed motor current and the desired motor current;
generating a first control action responsive to a non-adaptive control loop, the non-adaptive control loop to reduce the error function;
determining values of at least three estimated system parameters, the at least three estimated system parameters at least partially defining a relationship between control voltage and motor current of the motor;
tuning, using the determined values of at least three estimated system parameters, an adaptive control loop, the adaptive control loop to reduce the error function;
generating a second control action responsive to the first control action and the tuned adaptive control loop; and
performing the second control action.

2. The method of claim 1, comprising:
obtaining the first control action responsive to a difference between a desired waveform of the desired motor current and an observed waveform of the observed motor current;
obtaining a compensation component responsive to the determined values of at least three estimated system parameters; and
obtaining the second control action by adjusting the first control action responsive to the compensation component.

3. The method of claim 2, wherein the obtaining the compensation component responsive to the determined values of at least three estimated system parameters comprises: determining a component expected to compensate for at least one of the determined values of at least three estimated system parameters.

4. The method of claim 1, wherein the determining the values of at least three estimated system parameters comprises: determining values of at least three estimated parameters representative of system dynamics of the motor.

5. The method of claim 4, wherein the at least three parameters representative of system dynamics of the motor comprise: inductance, phase resistance, and rotor flux.

6. The method of claim 1, wherein the performing the second control action comprises providing a further control voltage to the motor.

7. The method of claim 1, wherein tuning the adaptive control loop comprises:
setting values for estimated gains from control actions corresponding to estimated system parameters using initial values;
generating a waveform for at least one system parameter; and
tuning a value of an estimated gain that corresponds to the at least one system parameter responsive to the waveform.

8. The method of claim 7, further comprising:
observing a stabilization period of the waveform; and
changing the value of the estimated gain responsive to a length of the stabilization period.

9. The method of claim 8, wherein changing the value of the estimated gain responsive to the length of the stabilization period comprises:
increasing the value of the estimated gain responsive to the length of the stabilization period being greater than a specified threshold.

10. The method of claim 8, wherein changing the value of the estimated gain responsive to the length of the stabilization period comprises:
decreasing the value of the estimated gain responsive to the length of the stabilization period being shorter than a specified threshold.

11. An apparatus, comprising:
at least one processor; and
a non-transitory machine-readable medium, the medium including instructions that, when executed by the processor, configure the processor to:
provide a control voltage to drive a permanent-magnet synchronous motor (PMSM);
perform a motor current tracking process to track an observed motor current to a desired motor current;
generate an error function representing a difference between the observed motor current and the desired motor current;
determine a first further control voltage responsive to a non-adaptive control loop, the non-adaptive control loop to reduce the error function;
determine values of at least three estimated system parameters, wherein the at least three estimated system parameters at least partially define a relationship between control voltage and motor current of the motor;
tune, using the determined at least three estimated system parameters, an adaptive control loop, the adaptive control loop to reduce the error function; and
provide a second further control voltage to drive the PMSM responsive to the first further control voltage and the tuned adaptive control loop.

12. The apparatus of claim 11, wherein the instructions, when executed by the processor, configure the processor to:
determine the first further control voltage responsive to a difference between a desired waveform of the desired motor current and an observed waveform of the observed motor current;
determine a compensation component responsive to the determined at least three estimated system parameters; and
determine the second further control voltage by adjustment of the determined first further control voltage responsive to the compensation component.

13. The apparatus of claim 12, wherein the instructions that configure the processor to determine the compensation component responsive to the at least three estimated system parameters comprise instructions that, when executed by the processor, configure the processor to: determine a component expected to compensate for at least one of the estimated system parameters.

14. The apparatus of claim 11, wherein the instructions that configure the processor to determine the at least three estimated system parameters of the motor comprise instructions that, when executed by the processor, configure the processor to:
determine at least three parameters representative of system dynamics of the motor.

15. The apparatus of claim 14, wherein the at least three parameters representative of system dynamics of the motor comprise: inductance, phase resistance, and rotor flux.

16. The apparatus of claim 11, wherein the instructions that configure the processor to tune the adaptive control loop comprise instructions that configure the processor to:
set values for estimated gains from control actions corresponding to estimated system parameters using initial values;
generate a waveform for at least one system parameter; and
tune a value of an estimated gain that corresponds to the at least one system parameter responsive to the waveform.

17. The apparatus of claim 16, wherein the instructions that configure the processor to tune the adaptive control loop comprise instructions that, when executed by the processor, configure the processor to:
observe a stabilization period of the waveform; and
change the value of the estimated gain responsive to a length of the stabilization period.

18. The apparatus of claim 17, wherein the instructions that configure the processor to change the value of the estimated gain responsive to the length of the stabilization period comprise instructions that, when executed by the processor, configure the processor to:
increasing the value of the estimated gain responsive to the length of the stabilization period being greater than a specified threshold.

19. The apparatus of claim 17, wherein the instructions that configure the processor to change the value of the estimated gain responsive to the length of the stabilization period comprise instructions that, when executed by the processor, configure the processor to:
decrease the value of the estimated gain responsive to the length of the stabilization period being shorter than a specified threshold.

20. A system, comprising:
a motor configured as a field-oriented controlled permanent-magnet synchronous motor; and
a driver, the driver configured to perform a current tracking process for tracking an observed motor current of the motor to a desired motor current of the motor, the current tracking process comprising:
generate an error function representative of a difference between the observed motor current and the desired motor current;
generate a first control action responsive to a non-adaptive control loop, the non-adaptive control loop to reduce the error function;
determine values of at least three estimated system parameters, wherein the at least three estimated system parameters at least partially define a relationship between control voltage and motor current of the motor;
tune, responsive to at least three estimated system parameters, an adaptive control loop, the adaptive control loop to reduce the error function; and
provide, responsive to the first control action and the tuned adaptive control loop, the control voltage for the motor.

21. The system of claim 20, wherein the driver comprises:
a motion profile generator to generate a desired motion profile responsive to at least three of a desired position and a desired speed;
a motion controller configured to output a desired current profile responsive to the desired motion profile; and
a current controller configured to output a control voltage responsive to the desired current profile.

22. The system of claim 21, wherein the current controller comprises:
a controller configured to implement a d-axis control loop; and
an adaptive controller configured to implement a q-axis control loop.

23. The system of claim 21, wherein the current controller comprises a Park transformer operably coupled to an output of a Clarke transformer, the operably coupled Park transformer and Clark transformer configured to receive an observed motor current and an observed motion of the motor and convert the observed motor current and the observed motion to a q-axis and d-axis component.

24. The system of claim 21, wherein the current controller comprises a pulse-width modulation generator configured to generate pulse-width modulated voltage control signals.

25. The system of claim 21, wherein the motion controller comprises:
a speed controller configured to determine a speed component of the desired motion profile; and
a position controller configured to determine a position component of the desired motion profile.

26. The system of claim 21, comprising:
a first feedback path for providing motion information about an operation of the motor to the motion controller; and
a second feedback path for providing motor current information about the motor current supplied to the motor to the current controller.

* * * * *

UNITED STATES PATENT AND TRADEMARK OFFICE
CERTIFICATE OF CORRECTION

PATENT NO. : 11,996,792 B2
APPLICATION NO. : 16/948906
DATED : May 28, 2024
INVENTOR(S) : Jason Qian and Betty Wang It is certified that error appears in the above-identified patent and that said Letters Patent is hereby corrected as shown below:

In the Specification

Column 9, Line 36, change "$i_a$, $i_b$, $i_c$ and" to --$i_a$, $i_b$, $i_c$, and--
Column 9, Line 38, change "from $i_s$ and $i_b$ using" to --from $i_a$ and $i_b$ using--
Column 9, Line 62, change "$i_s$ and $i_b$ and" to --$i_a$ and $i_b$ and--
Column 10, Line 26, change "$DC_b$, and $DC_C$) for" to --$DC_b$, and $DC_c$) for--
Column 11, Line 60, change "(e.g., $i_q^{ref}$) with" to --(e.g., $i\_{_q}^{ref}$) with--

Signed and Sealed this
Thirteenth Day of August, 2024

Katherine Kelly Vidal
*Director of the United States Patent and Trademark Office*